Figure 1:
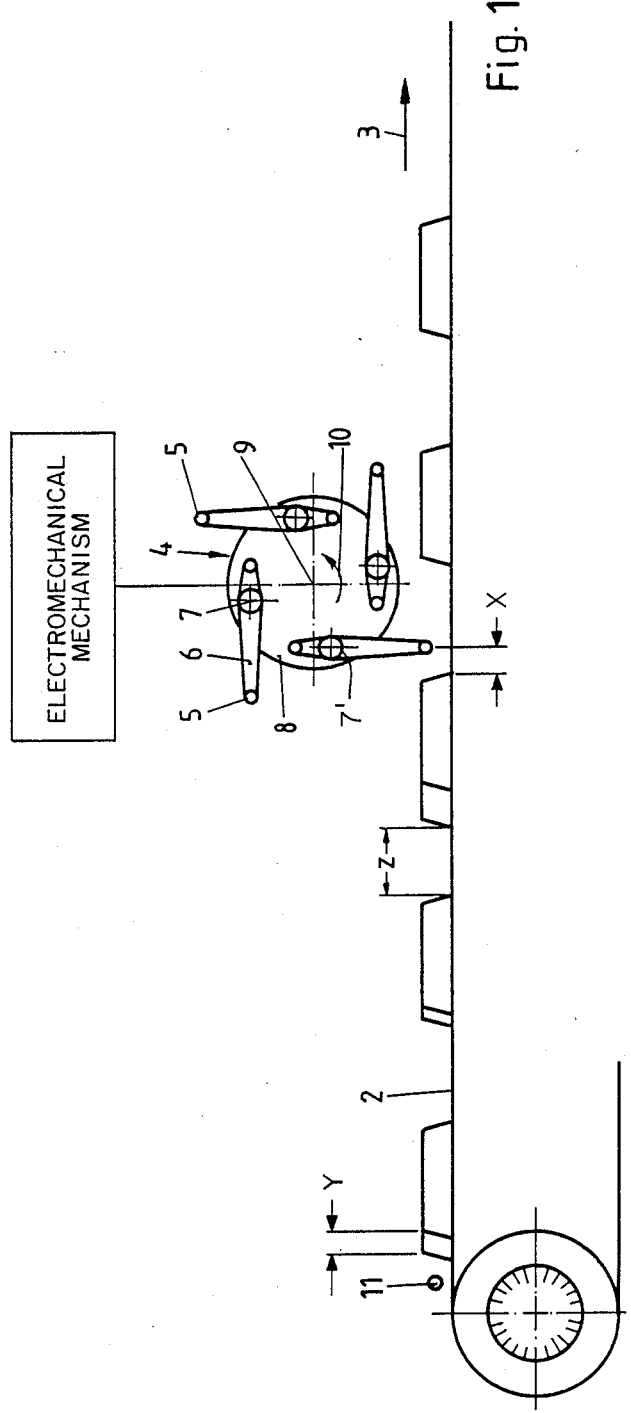

United States Patent [19]

Hogenkamp

[11] Patent Number: 4,892,181
[45] Date of Patent: Jan. 9, 1990

[54] METHOD AND ARRANGEMENT FOR ORIENTING CANDIES

[75] Inventor: Wilhelm Hogenkamp, Hanover, Fed. Rep. of Germany

[73] Assignee: Otto Hänsel GmbH, Hanover, Fed. Rep. of Germany

[21] Appl. No.: 168,150

[22] Filed: Mar. 15, 1988

[30] Foreign Application Priority Data

Mar. 19, 1987 [DE] Fed. Rep. of Germany ....... 3708881

[51] Int. Cl.$^4$ ........................................... B65G 47/26
[52] U.S. Cl. .................................... 198/434; 198/460
[58] Field of Search ............... 198/420, 434, 459, 460, 198/463.4

[56] References Cited

U.S. PATENT DOCUMENTS

| 3,053,373 | 9/1962 | Cross et al. | 198/434 |
| 3,335,841 | 8/1967 | Klingel et al. | 198/460 |
| 3,635,638 | 1/1972 | Bryan | 198/459 |
| 3,854,569 | 12/1974 | Steinhart et al. | 198/434 |
| 4,195,723 | 4/1980 | Loewenthal | 198/459 |
| 4,369,876 | 1/1983 | Small et al. | 198/460 |
| 4,535,881 | 8/1985 | Mims | 198/459 |
| 4,609,095 | 9/1986 | Lenherr et al. | 198/460 |

FOREIGN PATENT DOCUMENTS 1203708 1/1960 France .............................. 198/459

Primary Examiner—Joseph F. Valenza
Attorney, Agent, or Firm—Max Fogiel

[57] ABSTRACT

A method of and a device for aligning products like slabs and bars of chocolate or pastries on a conveyor belt by a retainer rod. The retainer rod descends from a raised position to between two adjacent rows of confections, travels along with the conveyor belt but at a lower speed, and, once the rows of confections have been aligned, accelerates, rises, and returns to its initial position.

13 Claims, 4 Drawing Sheets

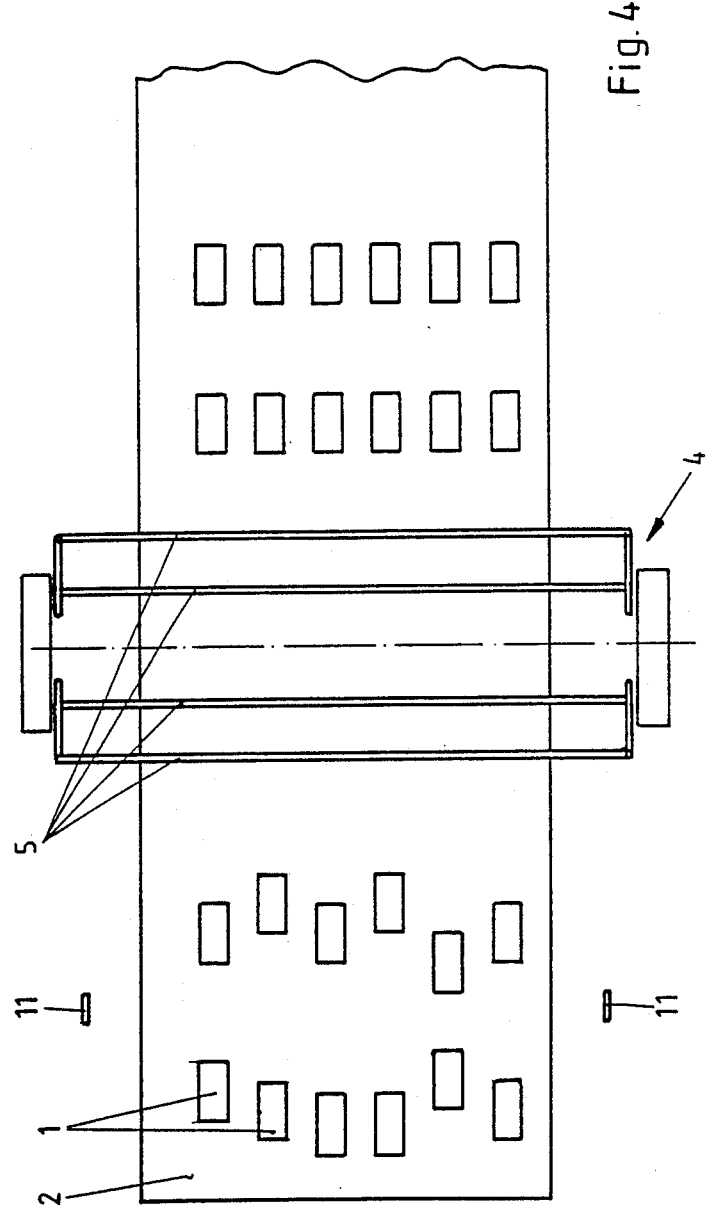

METHOD AND ARRANGEMENT FOR ORIENTING CANDIES

The present invention concerns a method of and a device for aligning products like slabs and bars of chocolate or pastries on a conveyor belt by means of a retainer rod.

Extruded confections like slabs and bars of chocolate for example usually arrive on a conveyor belt distributed in a series of rows. The rows, however, are not mutually equidistant, and the products in each row are not in alignment. It is accordingly necessary to align them for further processing.

The rows of confections usually encounter a stationary retainer rod, which they remain against until the rows straighten out, subsequent to which the rod is raised briefly to allow the aligned rows to travel on. Output is limited, however, in that the rod that the products encounter is stationary, and they come to a stop and must be accelerated again out of their stationary state. The speed of the conveyor belt can accordingly not be increased to the desired extent because the confections cannot be allowed to sustain any damage when encountering the retainer rod or to slide around during the subsequent acceleration, which would destroy the alignment.

The object of the invention is accordingly to solve this problem and create a method and a device that will allow alignment of rows of confections in a simple and cost-effective way at high output.

This object is attained in accordance with the invention in that the retainer rod descends from a raised position to between two adjacent rows of confections, travels along with the conveyor belt in the direction of travel at a lower speed, and, once the rows of confections have been aligned, accelerates, rises, and returns to its initial position. Since the retainer rod accordingly travels a certain distance along with the belt, the confections do not have to be brought to a stop when they encounter the rod. The retention that occurs when the products encounter the rod is slight and the products will not be damaged. Since the acceleration subsequent to alignment can also be much more gradual, the products will not slide around on the belt. The output of an aligning device that operates in this way can be at least twice that of conventional devices, and approximately 150 rows per minute can easily be attained.

It is practical for the retainer rod to travel along between the rows of confections on the conveyor belt until the rows are at a prescribed distance from each other. Such synchronization is not attainable with conventional aligning devices and must be provided in a separate station.

It is preferable for the distance between misaligned rows of confections and the degree of misalignment between the confections in one row to be measured and for the retainer rod to descend and travel along in accordance with the results of that measurement. This method of control is extraordinarily flexible and will prevent malfunction in case for example the distance between two rows is too short to allow introduction of a retainer rod, in which case the rod can remain elevated and the two rows involved separated out without having to stop the machinery.

Since the descending and rising retainer rod can also move horizontally above the conveyor belt, it can travel along with the belt to at least some extent. Since, however, it moves more slowly than the belt, the products on the belt will arrive and be able to align themselves. It is preferable to mount several retainer rods on a mechanism that rotates around a horizontal axis, moves the transverse rods over the conveyor belt, and, once the individual rows have been aligned, returns each rod to its starting position. The process is essentially controlled by the up and down revolution of the individual retainer rods, which can be operated independently of one another and in accordance with the distances between the rows and the degree of misalignment of the individual products.

Further practical embodiments of the invention are recited in the subsidiary claims.

Figure 2:
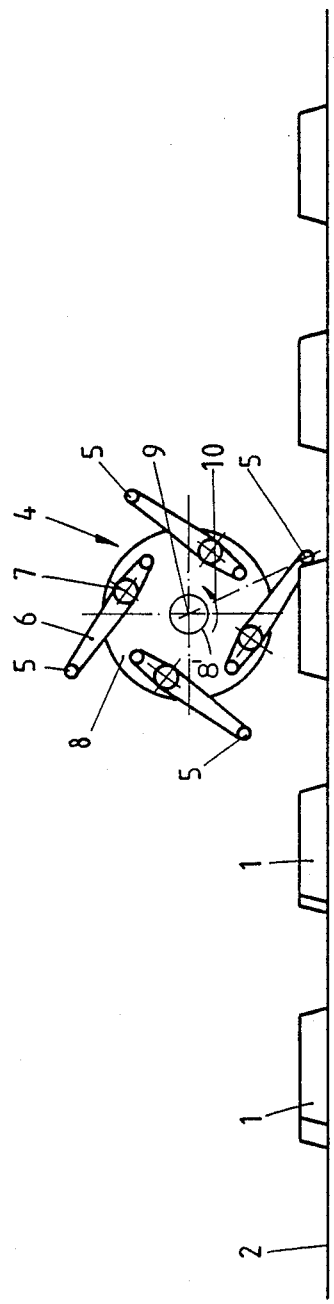
Figure 3:
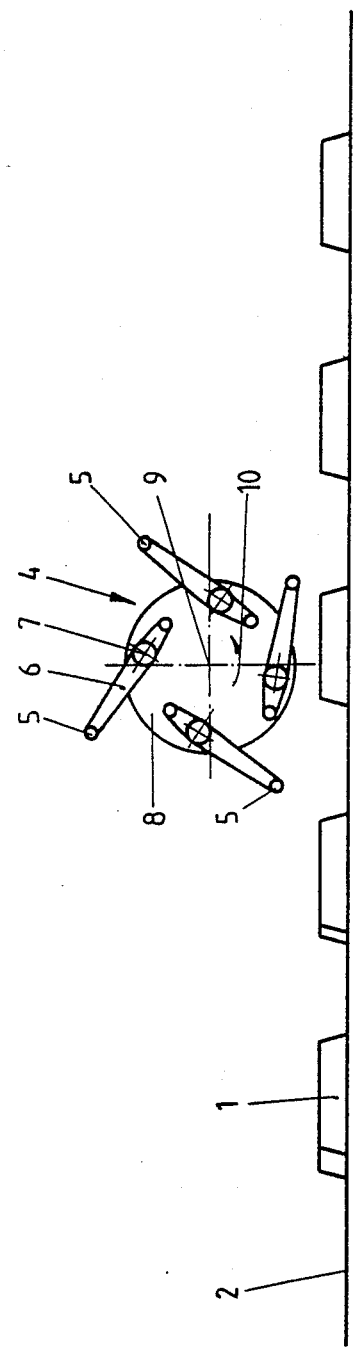

One embodiment of the invention will now be specified with reference to the drawings, wherein FIGS. 1–3 are schematic side views of the alignment device in various stages of operation and FIG. 4 is a schematic top view of the alignment device.

The products, slabs 1 of chocolate for example, arrive from an unillustrated production machine onto a conveyor belt 2. Slabs 1 are distributed next to one another in a row, although each slab can be displaced absolutely irregularly forward or backward in relation to the adjacent slabs. The degree of misalignment is represented in the drawings by the distance Y. Conveyor belt 2 travels in the direction indicated by arrow 3.

An alignment device 4 is positioned above conveyor belt 2. It is equipped with transverse rods 5 that extend over the total width of conveyor belt 2 and function as retainers for the rows of slabs of chocolate to be aligned. The mounts 6 that hold transverse rods 5 are in the form of arms that rotate by pivot 7' around more or less horizontal axes 7. Several mounts 6 are positioned on a common turntable 8 with an axis 9 of rotation that is also horizontal and accordingly parallels transverse rods 5. Turntable 8 rotates in the direction indicated by arrow 10. There is in a practical way a turntable 8 with mounts 6 at each end of transverse rods 5.

The device can be driven by conventional motors and transmissions 8' for example, which will not be specified herein. The device is controlled by means of a photoelectric cell 11 at the beginning of the belt that can detect individual rows of slabs and simultaneously the distance Z between them.

How the device operates will now be specified. As already mentioned herein, the rows of chocolate slabs arrive essentially misaligned on conveyor belt 2. They travel past photoelectric cell 11, which detects the rows and the distances between them. Depending on these results, a transverse rod 5 is lowered at a distance X upstream of a row of slabs. The rod is simultaneously advanced by rotating turntable 8 in the direction indicated by arrow 3. Since, however, this motion is decelerated in relation to that of the belt, the slabs of chocolate will encounter transverse rods 5 and displacement Y will be compensated. The row of slabs simultaneously arrives at the position illustrated in FIG. 2, where it is more or less below alignment device 4. As soon as the distance from the previously processed row attains a prescribed length, which can if necessary be determined by means of another photoelectric cell, mount 6 revolves up along with its transverse rod 5, releasing the row of slabs. The row is now in alignment and can be conveyed on for further processing. The procedure can be repeated immediately with the next row of slabs and with the next transverse rod. If the distance between two rows is too short to allow introduction of a rod, the situation will be detected by photoelectric cell 11 and the particular mount 6 will not descend with its associated rod, and the rod will travel on above the slabs. The row can then be separated out later.

This device will allow extraordinarily high outputs because the slabs do not have to be brought to a stop and then accelerated again as is the case with devices that operate with retainer blades that are stationary in relation to the conveyor belt. Furthermore, the device will also allow the aligned rows of slabs to be distributed at a prescribed constant distance from one another.

The device can be modified in a great number of ways and adapted to particular conditions. More or less transverse rods than those illustrated in the figures can be employed for example. In that case it will be preferable to control mounts 6 electromagnetically, so that they can be dropped and raised at different intervals. It will then be unnecessary to control the speed of the belt separately.

I claim:

1. A method for aligning elongated articles such as bars of chocolate or pastries on a conveyor, comprising the steps: transporting said articles with varying misalignments on a conveyor having a conveyor speed in a conveying direction, said articles being transported on said conveyor in spaced rows; measuring misalignment of each article upstream of said conveying direction; lowering an aligning retainer rod from a raised position to a position between two adjacent rows of said articles; transporting said retainer rod with said moving conveyor at a speed that is less than the speed of the conveyor, so that said articles abut said rod and are decelerated for a predetermined time interval only dependent on said measuring step; holding said retainer rod in abutment with an article for said time interval until misalignment of said article is zero, said time interval being sufficient for aligning the articles in a row and preventing thereafter disorientation of longitudinal axes of said articles.

2. A method as defined in claim 1, including the step of moving said aligning retainer rod along between rows of said articles on said conveyor until the rows are spaced at a predetermined distance from each other.

3. A method as defined in claim 1, including the step of measuring the distance between misaligned rows of articles and measuring misalignment between articles in one row; and descending said retainer rod and moving said retainer rod dependent on measurements obtained from said measuring steps.

4. A method as defined in claim 1, including the step of operating a plurality of different retainer rods in sequence.

5. An arrangement for aligning elongated articles such as bars of chocolate or pastries on a conveyor, comprising: conveyor means having a conveyor speed in a conveying direction for transporting said articles with varying misalignment, said articles being transported on said conveyor in spaced rows; means for measuring misalignment of each article upstream of said conveying direction; at least one aligning retainer rod movable horizontally above said conveyor means; means for lowering said retainer rod from a raised position to a position between two adjacent rows of said articles; means for transporting said retainer rod with said moving conveyor means at a speed that is less than the speed of said conveyor means so that said articles abut said rod and are decelerated for a predetermined time interval only dependent on measurements obtained from said measuring means; said retainer rod being held in abutment with an article for said time interval until misalignment of said article is zero, said time interval being sufficient for aligning the articles in a row and preventing thereafter disorientation of longitudinal axes of said articles.

6. An arrangement as defined in claim 5, including mounting means for said retainer rod, said mounting means being lowerable and raisable and being movable horizontally above said conveyor means.

7. An arrangement as defined in claim 6, including rotatable means for rotating about a horizontal axis, said mounting means being positioned with said retainer rod on said rotatable means.

8. An arrangement as defined in claim 7, wherein said rotatable means comprises a turntable.

9. An arrangement as defined in claim 7, wherein said mounting means comprises a plurality of mounts for a plurality of retainer rods, said mounts and retainer rods being positioned on said rotatable means.

10. An arrangement as defined in claim 5, wherein said measuring means has photoelectric cells positioned along said conveyor means for detecting distances between said rows of articles and amounts of misalignment within said rows.

11. An arrangement as defined in claim 6, including electromechanical means for pivoting said mounting means down and up.

12. An arrangement as defined in claim 10, including computer-controlled electromechanical means operating with said photoelectric cells.

13. An arrangement for aligning elongated articles such as bars of chocolate or pastries on a conveyor, comprising: conveyor means having a conveyor speed in a conveying direction for transporting said articles with varying misalignment, said articles being transported on said conveyor in spaced rows; means for measuring misalignment of each article upstream of said conveying direction; at least one aligning retainer rod movable horizontally above said conveyor means; means for lowering said retainer rod from a raised position to a position between two adjacent rows of said articles; means for transporting said retainer rod with said moving conveyor means at a speed that is less than the speed of said conveyor means so that said articles abut said rod and are decelerated for a predetermined time interval only dependent on measurements obtained from said measuring means; said retainer rod being held in abutment with an article for said time interval until misalignment of said article is zero, said time interval being sufficient for aligning the articles in a row and preventing thereafter disorientation of longitudinal axes of said articles; mounting means for said retainer rod, said mounting means being lowerable and raisable and being movable horizontally above said conveyor means; rotatable means for rotating about a horizontal axis, said mounting means being positioned with said retainer rod on said rotatable means; said measuring means having photoelectric cells positioned along said conveyor means for detecting distances between rows of articles and amounts of misalignment within said rows; electromechanical means for pivoting said mounting means down and up.

* * * * *